US008953672B2

(12) United States Patent
Delattre et al.

(10) Patent No.: US 8,953,672 B2
(45) Date of Patent: Feb. 10, 2015

(54) METHOD AND DEVICE FOR COMPRESSING A VIDEO SEQUENCE

(75) Inventors: Alexandre Delattre, Paris (FR); Edouard Gomez, Paris (FR)

(73) Assignee: Mobiclip, Paris (FR)

(*) Notice: Subject to any disclaimer, the term of this patent is extended or adjusted under 35 U.S.C. 154(b) by 531 days.

(21) Appl. No.: 13/321,341

(22) PCT Filed: May 12, 2010

(86) PCT No.: PCT/EP2010/056575
§ 371 (c)(1),
(2), (4) Date: Feb. 8, 2012

(87) PCT Pub. No.: WO2010/133498
PCT Pub. Date: Nov. 25, 2010

(65) Prior Publication Data
US 2012/0128077 A1 May 24, 2012

(30) Foreign Application Priority Data
May 18, 2009 (FR) ..................................... 09 53262

(51) Int. Cl.
*H04N 11/04* (2006.01)
*H04N 19/149* (2014.01)
*H04N 19/126* (2014.01)
*H04N 19/152* (2014.01)
*H04N 19/172* (2014.01)
*H04N 19/159* (2014.01)
*H04N 19/61* (2014.01)
(Continued)

(52) U.S. Cl.
CPC ... *H04N 19/00181* (2013.01); *H04N 19/00096* (2013.01); *H04N 19/00193* (2013.01); *H04N 19/00266* (2013.01); *H04N 19/00218* (2013.01); *H04N 19/00781* (2013.01); *H04N 19/00363* (2013.01); *H04N 19/0009* (2013.01)
USPC ................................ 375/240.03; 375/240.12

(58) Field of Classification Search
None
See application file for complete search history.

(56) References Cited

U.S. PATENT DOCUMENTS 6,192,154 B1 * 2/2001 Rajagopalan et al. ........ 382/232
7,346,106 B1 * 3/2008 Jiang et al. ............... 375/240.12
2002/0044603 A1 * 4/2002 Rajagopalan et al. ... 375/240.03
(Continued)

FOREIGN PATENT DOCUMENTS

EP          1 524 860          4/2005
WO     WO 2005/011255         2/2005
WO     WO 2008/042259 A2 *   4/2008

OTHER PUBLICATIONS

Cai, Jianfei and Chang Wen Chen, "Two-pass video encoding for low bit rate streaming applications", Visual Communications and Image Processing 2002, Proceedings of the SPIE, 2002, pp. 202-208.*
(Continued)

*Primary Examiner* — William C Vaughn, Jr.
*Assistant Examiner* — Michael Bennett
(74) *Attorney, Agent, or Firm* — Nixon & Vanderhye, P.C.

(57) ABSTRACT

The present invention relates to the field of video compression and, specifically, to controlling the bit rate of the generated compressed sequence. This invention relates to a method for constant bit rate compression, using a step of normalizing the compression ratio. Variations in said ratio can thus be smoothed out, eliminating sudden variations in image quality in the resulting sequences. The perceived quality of the service is thereby improved.

10 Claims, 2 Drawing Sheets

(51) Int. Cl.
*H04N 19/194* (2014.01)
*H04N 19/124* (2014.01)

(56) References Cited

U.S. PATENT DOCUMENTS

2005/0041689 A1* 2/2005 Wu et al. .................... 370/477
2005/0058200 A1* 3/2005 Lu et al. ................. 375/240.12
2006/0126728 A1* 6/2006 Yu et al. ................. 375/240.03

OTHER PUBLICATIONS

Lin, Liang-Jin, A. Ortega, and C. Kuo, "Gradient-based buffer control technique for MPEG", Visual Communications and Image Processing '95, Proceedings of the SPIE, 1995, pp. 1502-1513.*

International Search Report for PCT/EP2010/056575, mailed Jun. 24, 2010.

Foreign-language Written Opinion of the International Searching Authority for PCT/EP2010/056575, mailed Jun. 24, 2010.

Cai, J. et al., "Two-pass video encoding for low-bit-rate streaming applications", Visual Communications and Image Processing, (Jan. 21, 2002), pp. 204-206.

Lin et al., "Gradient-based buffer control technique for MPEG", Proceedings of SPIE Visual Communications and Image Processing, (May 1995), pp. 1-5.

Westerink, P.H. et al., "Two-pass MPEG-2 variable-bit-rate encoding", IBM Journal of Research and Development, vol. 43, No. 4, (Jul. 4, 1999), pp. 471-488.

Yue, Y. et al., "A Novel Two-Pass VBR Coding Algorithm for Fixed-Size Storage Application", IEEE Transactions on Circuits and Systems for Video Technology, vol. 11, No. 3, (Mar. 1, 2011), pp. 347-352.

Hoang, D.T. et al., "Lexicographic bit allocation for MPEG Video Coding", Image Processing, vol. 1, (Oct. 26, 1997), pp. 322-325.

Cherniavsky, N. et al., "MultiStage: A MINMAX Bit Allocation Algorithm for Video Coders", IEEE Transactions on Circuits and Systems for Video Technology, vol. 17, No. 1, (Jan. 1, 2007), pp. 59-62.

International Preliminary Report on Patentability for PCT/EP2010/056575, dated Dec. 1, 2011.

Correction of Page Numbers: Cherniavsky, N. et al., "MultiStage: A MINMAX Bit Allocation Algorithm for Video Coders", IEEE Transactions on Circuits and Systems for Video Technology, vol. 17, No. 1, (Jan. 1, 2007), pp. 59-67.

* cited by examiner

METHOD AND DEVICE FOR COMPRESSING A VIDEO SEQUENCE

This application is the U.S. national phase of International Application No. PCT/EP2010/056575, filed 12 May 2010, which designated the U.S., and claims priority to FR application Ser. No. 09/53262, filed 18 May 2009, the entire contents of which is hereby incorporated by reference.

The present invention concerns the field of video compression and more particularly controlling the bit rate of the compressed sequence generated.

Compressing video by algorithms of the MPEG type that use, among other things, a quantisation technique is known. This quantisation consists of dividing the numerical values representing the frequencies of the image after the DCT (Discrete Cosine Transform) step in order to reduce the dynamic range of these values, which reduces the information to be compressed. The quantisation parameter is therefore the factor by means of which the data is divided which determines the number of bits necessary for coding each point. The visual impact of this quantisation will depend on the content of the image. For equal bit rates, the low-complexity images will support a high reduction in the dynamic range without any substantial impact, while on images of high complexity a high reduction in the dynamic range is quickly very appreciable.

When a video sequence is compressed, the quantisation factor is therefore generally variable and fixed for each image according to a set of characteristics of the image. Fixing this parameter will directly influence the quantity of data resulting from the compression for this image, as well as the perceived quality of the image.

In a similar fashion, some compression techniques control the size and quality of the image by varying a so-called "Lagrangian" factor $\lambda$, which optimises the "rate/distortion" ratio by using Lagrange mathematical optimisation techniques as described for example in the patent FR 2907989.

In this invention, this "compression factor" can advantageously be substituted for the quantiser. The two quantities are moreover sometimes used as linked by a law of the type $\lambda = e^Q$.

In compression without constraints, of the VBR (Variable Bit Rate) type for example, the objective is generally to obtain a constant visual quality throughout the video, which generally amounts to seeking low variations of the "compression factor", which we will call "C" and may correspond to the quantisation factor "Q" or the Lagrangian factor "$\lambda$".

Constant bit rate or CBR compression, which fixes the quantity of data that are to be generated by the compression for each second of sequence, independently of the content of the image, causes abrupt variations in the compression factor used between successive images. These variations may give rise to abrupt variations in the video quality perceived by the user and therefore degrade his perception of the quality of the service.

The invention aims to solve the above problems by means of a constant bit rate compression method, using a step of normalising the compression factor. This smoothes the variations in this factor and eliminates the abrupt variations in image quality in the resulting sequences. By this means, the perceived service quality is improved.

The invention concerns a method of compressing a video sequence that comprises a first step of compressing the sequence during which, for each image, its size and the compression factor used are extracted; a step of normalising the values of the compression factor associated with each image in order to optimise this factor under the constraint of the buffer of the receiver provided for decompressing the sequence and a second step of compressing the sequence using the normalised values of the compression factor for each image in the sequence.

According to a particular embodiment of the invention, the normalisation step comprises the simulation of the filling level of the buffer of the receiver provided for decompressing the sequence.

According to a particular embodiment of the invention, the simulation of the filling level of the buffer of the receiver provided for decompressing the sequence comprises a step of initialising the buffer to an arbitrary initial value; for each new image in the sequence, calculating a new filling level according to the size of the new image and taking account of the consumption of the data by the decompression; in the case where there is no overflow or famine of the buffer, looping onto the following image takes place; in the case where there is overflow or famine, a step of determining an image already processed in the sequence associated with an extreme value of the compression factor associated with these images already processed; a step of modifying the value of the compression factor associated with this determined image, reducing the size of the image in the case of famine, increasing the size of the image in the case of overflow; a step of backward return to the calculation of the simulation as far as this determined image.

According to a particular embodiment of the invention, the step of determining an image already processed in the sequence associated with the extreme value of the compression factor associated with these images already processed consists of choosing the oldest one.

According to a particular embodiment of the invention, the method also comprises a step of local optimisation of the value of the compression factor of each image.

According to a particular embodiment of the invention, the step of local optimisation of the value of the compression factor "C" is a step of gradient descent in order to minimise a measured distance between the local values of "C" and the optimum local values of "C".

According to a particular embodiment of the invention, the method also comprises a step of adjusting the value of the compression factor according to the type, "I" or "P", of the image, depending on whether or not the image is compressed intrinsically.

According to a particular embodiment of the invention, the method comprises a step of estimating the size of the compressed image according to the value of the compression factor by means of a model linking these values.

According to a particular embodiment of the invention, the method previously described is applied to a sequence forming a sliding window of the diffused stream.

The invention also concerns a device for compressing an image sequence that comprises means for performing a first step of compressing the sequence; means of normalising the values of the compression factor associated with each image in order to optimise this factor under the constraint of the buffer of the receiver provided for decompressing the sequence and means for performing a second step of compressing the sequence using the normalised value of the compression factor for each image in the sequence.

The features of the invention mentioned above, as well as others, will emerge more clearly from a reading of the following description of an example embodiment, said description being given in relation to the accompanying drawings, among which:

Figure 1:
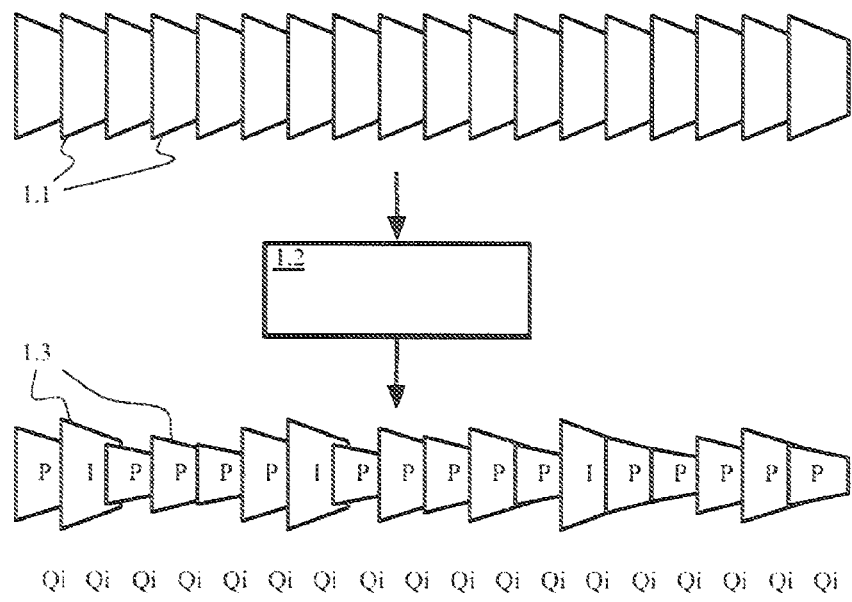
FIG. 1 illustrates the principle of compressing a video sequence.

FIG. 1 illustrates the principle of compressing a video sequence. This sequence is composed of a succession of images of identical size 1.1. To compress this sequence, the compression module 1.2 will compress each image in order to obtain a compressed sequence 1.3. In general terms, and typically in the compression algorithms in the MPEG family, some images are compressed intrinsically without having recourse to information external to the current image. These images are called "I" images. Other images are compressed while taking account of information belonging to other images, the previous or following one, in the video sequence. These images are generally called "P" images (or "B", according to custom). The "P" images make it possible to exploit temporal redundancy during compression. For example, a macroblock of the image is compressed by storing the difference with the macroblock of the previous image and the relative situation in the image of this previous macroblock. Regular compression of intrinsic "I" images is necessary, since these images are the only starting points for the decompression process.

In this compression process, the images are not all equivalent. Apart from the compression of the "I" or "P" type, the complexity of each image or the quantity of information contained in the image will determine the compression. Here destructive compression is spoken of, where the information is lost during compression. The quality of the image is defined according to the difference between the uncompressed starting image and the result, that is to say the image obtained by decompression of the compressed image. In this result image information is lost and the image is therefore degraded. The difference between the original image and the image resulting from the compression decompression process is referred to as distortion. Another parameter of the compression is, for each image, the size of the compressed image or the level of compression applied. It will be understood that, for a given image, the more the compression level is increased, the more the size of the compressed image is decreased and the more the quality level of the image obtained is degraded. For a given compression level, an image of low complexity is compressed with better quality than a complex image or, in other words, for a given quality level, an image of low complexity can be compressed to a higher level and lead to a smaller compressed image than a complex image.

A compression at constant bit rate or CBR means that the bit rate of the sequence of compressed images is constant, as its name so indicates, that is to say the sum of the sizes of the compressed images corresponding to a given period of the video, typically one second, is constant. This does not necessarily mean that all the images are compressed at a constant size. The sizes of the compressed images may vary slightly in so far as the constraint is complied with for a given period.

During the compression process, an equation may be made between the value "r" of the bit rate of the compressed sequence and the quantisation value "Q" used during the compression phase. The algorithm and the modelling used are for example of the MPEG class and therefore by prediction and then spatio-frequency transformation and then quantisation.

It has been shown that this equation can take the following form:

$$\ln(r) = \alpha \cdot Q + \sigma; \qquad \text{eq. 1}$$

where "r" is therefore the bit rate of the compressed sequence, "Q" the quantisation factor, σ and α are two parameters that are obtained during tests. Empirically σ corresponds to the theoretical size of the image for Q=0, that is to say in the absence of quantisation, that is to say a measure of intrinsic complexity of the image having a high value if the image if complex and a low value if the image is of low complexity.

This equation can also be written in the following form:

$$e^\sigma = re^{-\alpha Q}; \qquad \text{eq. 2}$$

or:

$$Q = \alpha^{-1} \ln\left(\frac{r}{e^\sigma}\right) \qquad \text{eq. 3}$$

This equation was determined by using linear regressions, and the prediction quality is good. It was determined that, for sequences to the QVGA format, that is to say a quarter of VGA composed of images of size 320×240 pixels, the parameters σ and α have values of approximately 10 and −0.1 for "Q" varying typically from 10 to 50, and "r" expressed in kilobits/s. These values vary from one sequence to another and from one image to another in proportions ranging from 10 to 20%. These values are not completely independent and a quick estimation gives:

$$\sigma = -50\alpha + 5; \qquad \text{eq. 4}$$

These equations can be used for calculating an approximate value of the size of a compressed image when the quantisation factor "Q" applied is varied without repeating the actual compression of the image. The value of α can be known only after two passes, and in consequence and according to the tests an approximate value of α is used, called ã, which is equal to −0.125 for a "P" image and −0.09 for an "I" image.

σ is a logarithmic value, and for arithmetic ease the value $e^\sigma$ will rather be used. This value, which characterises the intrinsic complexity of the image, is unknown for the current image on which work is being carried out. Advantageously an estimated value calculated on a few previous images will be used, typically the images corresponding to a sequence of a second preceding the current image called $e^\sigma$.

Knowing for the current image estimated values α and $e^\sigma$, given a target bit rate r̃, equation 3 enables us to find an estimated value of the quantisation factor that can be applied to the current image in order to aim at the bit rate sought. It is also possible conversely to estimate the size of the compressed image given a given quantisation factor Q.

This method can be generalised using the Lagrangian factor "λ" instead of the quantisation factor "Q" and can therefore be established for the compression factor "C".

The known constant bit rate compression algorithms generally cause abrupt variations in the quantisation factor according to the complexity of the images to be compressed. These abrupt variations may give rise to a substantial variation in the perceived quality of the images when the sequence is decompressed. This effect is a nuisance. The invention therefore aims to smooth the variations in the quantisation factor and to optimise this factor so as firstly to avoid excessively large variations from one image to another and secondly to improve the quality of the images by using the lowest possible quantisation factor as well complying with the compression constraints.

Figure 2:
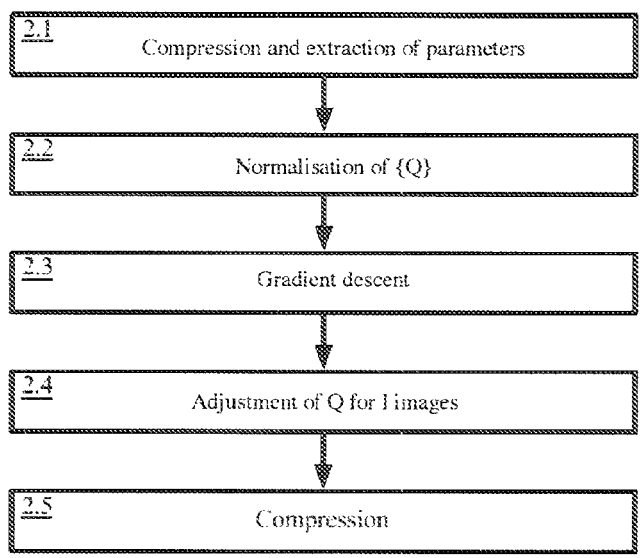
FIG. 2 illustrates the compression method according to one embodiment of the invention.

The general operating algorithm of the compression method according to the example embodiment of the invention is illustrated in FIG. 2. During a first step 2.1 a first compression is performed according to a technique known from the prior art of the MPEG type. The compression can be carried out with a strictly constant bit rate in order to be under conditions close to the objective. This step also makes it possible to extract parameters related to this first compression phase. Thus, for each image in the sequence, at least the following parameters are extracted: the number "i" of the image, the type "I" or "P" of the image, the quantisation factor used $Q_i$ and the size of the image $T_i$. Therefore in particular the series $\{Q\}$ of the values of the quantisation factor used for each image is obtained. The result is a step 2.2 of normalising these values of the quantisation factor. During this step, the values of the quantisation factor will be adjusted by somewhat relaxing the strictly constant bit rate constraint. To do this, the buffer of the receiver responsible for restoring the sequence and therefore initially the decompression is modelled. The filling level of this buffer is modelled and the strict constant bit rate constraint is softened in order to become a constraint for maintaining the filling level of the destination buffer between two target values, a minimum value and maximum value. In fact, the functioning of the sequence broadcasting chain is assured provided that this constraint is complied with and overflow or famine at the buffer of the receiver of the sequence is avoided. During this normalisation phase, the values of the quantisation factor are therefore acted on in order to optimise this factor under the constraint of the buffer of the receiver provided for decompressing the sequence. This step advantageously takes place without any new compression of the image, the size of which is then estimated using the formulae described above. Alternatively, the exact size could be obtained by recompressing the image.

Once the values of the quantisation factor have been thus normalised, an optional step 2.3 of optimisation of these values by a gradient descent can occur. This step makes it possible best to adjust the value of the quantisation factor to the local minimum. It makes it possible to minimise the Euclidian distance (MSE), or any other more suitable metric, between the local value of "Q" and an optimum mean value of the values of "Q", for example Q constant over the sequence. During this optional step, advantageously, the image is also not recompressed and the size thereof is estimated using the above formulae for the new values of the quantisation factor used. However, it goes without saying that it would possible to recompress the image.

Another optional step 2.4 aims to favour the quality of the compressed images intrinsically, the type "I" images, since the quality thereof "propagates" into the following P images, which therefore benefit at less cost from the extra quality of the previous I image. The value of the quantisation factor for these images is for example decreased by one unit.

Once the new values of the quantisation factors have been obtained by the normalisation step and any gradient descent and adjustment steps, a new compression step 2.5 is carried out using these new values of the quantisation factor.

In more general terms, this compression technique can be applied to a sequence forming a sliding window of the flow broadcast live. The advantage being analysing in lookahead mode the complexity of the next scenes. The disadvantage being encoding latency caused by the length of the sliding window.

Figure 3:
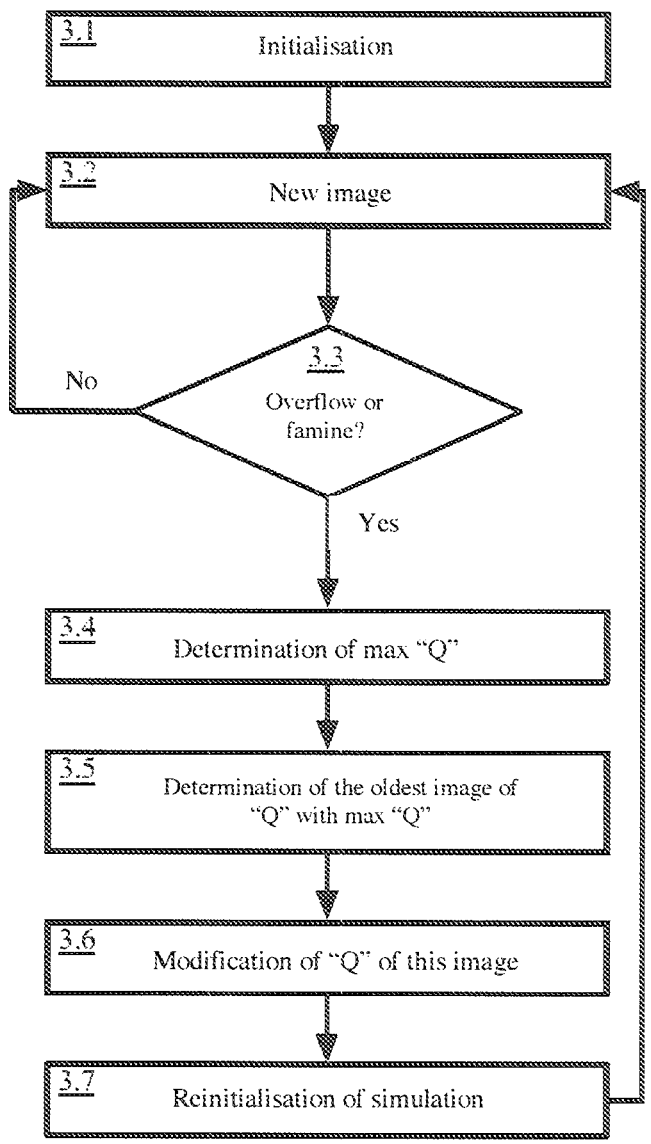
FIG. 3 illustrates the method of the normalisation step according to one embodiment of the invention.

According to an example embodiment of the invention, the normalisation step takes place according to the size of the compressed image obtained and the buffer of the receiver simulated. The filling level of the buffer of the receiver is simulated. This simulation poses the postulate of a filling of the buffer at a constant bit rate with a quantity of data making up the images of variable sizes. These sizes are obtained from data of the first compression step adjusted by the estimations obtained by the model described above when the value of the quantisation factor "Q" is varied. It is also considered that the buffer empties at a given rate in terms of the number of images per second fixed by the retrieval of the video sequence. This buffer is initialised to an arbitrary initial filling level which may for example correspond to a buffer half full. Its filling level is updated for each image and an overflow or famine test for the buffer is executed. As long as the buffer is not subject to overflow or famine, the value of the quantisation factor Q is not modified. FIG. 3 illustrates this normalisation step. During a step 3.1, the filling level of the buffer is initialised to half its capacity. For each new image, during step 3.2 the new filling level of the buffer is calculated according to the size of the new image and taking account of the consumption of data by the decompression. During step 3.3, it is tested whether this new filling level causes overflow or famine of the buffer. This overflow or famine may be defined strictly by an empty or full buffer or defined relative to given minimum and maximum thresholds. If such is not the case, the following image is looped onto. If such is the case, step 3.4 is passed to, where it is determined what is the extreme value of the quantisation factor associated with one of the images already processed in the sequence. Once this extreme value has been identified, the oldest image in the sequence associated with this extreme value of the quantisation factor can advantageously be sought during step 3.5. Once this image is determined, it is therefore the oldest image associated with the extreme value of the quantisation factor. Intuitively, if an image has a maximum Q, this is because it is more altered than the mean of the images and is therefore the one that will benefit most from a reduction in the Q factor. Respectively, if an image has a minimum Q, it is that it is less altered than the mean of the images and is therefore the one that will suffer the least from an increase in the Q factor. Choosing the oldest image makes it possible to obtain more flexibility in the remainder of the algorithm, which will then be able to modify all the most recent images. The value of the quantisation factor associated with this image will then be modified so as to modify the filling level of the buffer during step 3.6. If the buffer is in famine, it will be sought to increase the quantity of data to be consumed and therefore to increase the value of the quantisation factor. In the converse case, if the buffer is overflowing, it will be sought to increase this quantity of data by decreasing the value of the quantization factor, for example by one unit. Once this new value of the quantisation factor has been adopted, the simulation is resumed by reinitialising the calculation of the simulation of the filling level of the buffer to the image the Q value of which has been modified, that is to say step 3.7. The calculation of the simulation is therefore gone back to as far as this oldest image allocated the largest or smallest value of "Q" and the entire simulation is repeated from this image. The process is continued until a normalised series of values of the quantisation factor that does not cause overflow or famine of the buffer of the receiver is obtained. This technique has the advantage of reducing the dispersion of the values of "Q".

Advantageously, "one" of the highest values (or respectively the lowest) can be chosen without taking "the" highest value (or the lowest) in absolute terms. This makes it possible for example to obtain an older image.

The optional gradient descent step consists of a local optimisation of the quantisation factor. It is sought for example to optimise an MSE error (Minimum Square Error) or any other metric measuring quality optimisation objective by modifying the quantisation factor "Q". This metric measures the difference between the distribution of the Q values and an optimum distribution of these values. Typically the gradient descent rate is approximately 0.5, which proves to be a good compromise between the granularity of the values of the quantisation factor "Q" and the convergence speed of the algorithm. The descent is stopped by a threshold on the calculation of the error, for example 1%. Therefore, as soon as the improvement in the error measured by the MSE is less than 1%, the descent is stopped. The descent to rank "n" is typically calculated by the following formula:

$$Q_{n+1} = V \cdot (Mf(Q) - Q_n);$$

where Mf(Q) represent a mean, optionally calculated on a sliding window, of the value "Q" obtained after normalisation and "V" the gradient descent speed. Therefore, if the MSE error obtained with the value $Q_{n+1}$ is more than 1% less than the MSE error obtained for the value $Q_n$, the process is continued, or otherwise it is stopped.

Advantageously, "Q" can take non-integer values during the descent.

Advantageously, a feedback loop is effected at this level in order to ensure that the tolerance limits of the buffer of the receiver are remained within.

Advantageously, a step of adjusting the value of "Q" is performed in addition according to the type of image, "I" or "P". This step consists of a reduction of the value of "Q" by one unit for the "I" images. The effect of this step is to favour the quality of the "I" images that is essential during decompression.

At the end of these steps, a normalised and possibly optimised series of the value of the quantisation factor "Q" associated with each image in the sequence is obtained. A further step is then to perform a new compression by means of this series of quantisation factors.

The whole method can be generalised by using the compression factor "C" instead of the quantisation factor "Q".

The method described here can be implemented in the form of a dedicated electronic component or be programmed on an information processing device such as a normal computer.

The invention claimed is:

1. Method of compressing a video sequence of images using an information processing apparatus in the form of a computer or a dedicated electronic compression module component, the method comprising:
   using a computer or dedicated compression module component to first compress the video sequence at a constant bit rate and determine a compressed image size value and an associated compression factor value for each image in the sequence;
   using said computer or dedicated compression module component to compute normalized values of compression factor values associated with each compressed image such that a normalized compression factor value is optimized in accordance with a size of a particular receiver buffer to be used for decompressing the sequence,
   wherein computing normalized compression factor values comprises using said computer or dedicated compression module component to perform calculations for simulating a data filling level of the receiver buffer
   (a) setting an initial filling level of a simulated receiver buffer to a predetermined initial value;
   (b) for each successive image in the video sequence, calculating a filling level based upon a size of the image, the associated compression factor and a predetermined rate of data consumption from said particular receiver buffer which would occur during decompression of the data;
   (c) in a case where a calculated filling level for a particular image in the video sequence causes neither overflow nor famine of the simulated receiver buffer, the associated compression factor is retained and a filling level for a next successive image in the video sequence is calculated;
   (d) in a case where a calculated filling level causes an overflow or famine within the simulated receiver buffer, the computer processor or compression module component further performs operations of:
      (i) identifying an oldest image having an associated compression factor value which is a maximum or minimum amongst compression factor values of the images in the video sequence compressed at the constant bit rate;
      (ii) modifying the associated compression factor value of the identified oldest image so as to increase a quantity of image data to be decompressed in a case of famine within the buffer and decrease a quantity of image data to be decompressed in a case of overflow of the buffer; and
      (iii) beginning with said identified oldest image, perform a rain said calculations for simulating a data filling level of said particular receiver buffer for each successive image in the video sequence;
   and, using said computer or dedicated compression module component to compress the video sequence a second time using the computed normalized values of said compression factor value associated with each image.

2. Method according to claim 1, characterized in that the step of determining an image already processed in the sequence associated with the extreme value of the compression factor associated with these images already processed consists of choosing the oldest.

3. Method according to claim 1, characterized in that it also comprises a step of local optimization of the value of the compression factor of each image.

4. Method according to claim 3, characterized in that the step of local optimization of the value of the compression factor "C" is a step of gradient descent in order to minimize a distance measured between the local values of "C" and the optimum local values of "C".

5. Method according to claim 1, characterized in that it also comprises a step of adjusting the value of the compression factor according to the type, "I" or "P", of the image, depending on whether or not the image is compressed intrinsically.

6. Method according to claim 1, characterized in that it comprises a step of estimating the size of the compressed image according to the value of the compression factor by means of a model linking these values.

7. Method of compressing a stream broadcast live, characterized in that the method according to claim 1 is applied to a sequence forming a sliding window of the broadcast stream.

8. An apparatus for compressing an image sequence, comprising a dedicated electronic compression module component or an information processing computer component configured to:
   compress the image sequence at a constant bit rate and determine a compressed image size value and an associated compression factor value for each image in the compressed image sequence;
   calculate normalized values for each compression factor associated with each image in order to optimize each compression factor in accordance with a size of a particular receiver buffer to be used for decompressing the image sequence; and compress the image sequence a second time using the computed normalized values of the compression factor of each image of the image sequence;

wherein calculating normalized compression factor values comprises performing calculations for simulating a data filling level of the receiver buffer, and wherein simulating a data filling level of the particular receiver buffer comprises:

setting an initial filling level of a simulated receiver buffer to a predetermined value;

for each successive image in the sequence, calculating a filling level for the simulated receiver buffer based upon with both a size of the image and a rate of consumption of data from said particular receiver buffer to be used for decompressing the sequence;

a case where a calculated filling level for a particular image in the sequence causes neither overflow nor famine of the simulated receiver buffer, the associated compression factor is retained and a filling level for a next successive image in the sequence is calculated;

in the case where a calculated filling level causes an overflow or famine within the simulated receiver buffer, the compression module component or information processing computer component further performs operations of:

identifying an oldest image having an associated compression factor value which is a maximum or minimum amongst compression factor values of the images in the image sequence compressed at the constant bit rate;

modifying the associated compression factor value of the identified oldest image so as to increase a quantity of image data to be decompressed in the case of famine, within the buffer and decrease a quantity of image data to be decompressed in a case of overflow of the buffer; and beginning with said oldest identified image, perform again said calculations for simulating a data filling level of said particular receiver buffer for each successive image in the image sequence.

9. Method of compressing a video sequence of images using an information processing apparatus in the form of a computer or a dedicated electronic compression module component, the method comprising:

initially compressing the video sequence at a constant bit rate;

using the computer or dedicated compression module component to compute a normalized value of a compression factor value associated with each compressed image such that the normalized compression factor value is optimized in accordance with a size of a particular receiver buffer to be used for decompressing the sequence, wherein computing normalized compression factor values comprises using the computer or dedicated compression module component to simulate a data filling level of the receiver buffer, and wherein in a case where a simulated filling level causes an overflow or famine within the receiver buffer, the computer processor or compression module component further performs operations of:

(i) identifying an oldest image having an associated compression factor value which is a maximum or minimum amongst compression factor values of the images in the video sequence compressed at the constant bit rate;

(ii) modifying the associated compression factor value of the identified oldest image so as to increase a quantity of image data to be decompressed in a case of famine within the buffer and decrease a quantity of image data to be decompressed in a case of overflow of the buffer; and (iii) beginning with said identified oldest image, perform simulating a data filling level of the receiver buffer again for each successive image in the video sequence; and compressing the video sequence a second time using computed normalized compression factor values for the compression factor value associated with each image.

10. A non-transitory computer-readable storage medium having stored therein an information processing program executed by a dedicated electronic compression module processing component or an information processing computer component, the information processing program causing the compression module processing component or information processing computer component to:

initially compress the image sequence at a constant bit rate and determine an associated compression factor value for each image in the compressed image sequence, wherein determining normalized compression factor values comprises performing calculations for simulating a data filling level of a particular receiver to be used for decompressing the image sequence, and wherein in a case where a calculated filling level causes an overflow or famine within the simulated receiver buffer, the compression module component or information processing computer component further performs operations of:

identifying an oldest image having an associated compression factor value which is a maximum or minimum amongst compression factor values of the images in the video sequence compressed at the constant bit rate;

modifying the associated compression factor value of the identified oldest image so as to increase a quantity of image data to be decompressed in a case of famine within the buffer and decrease a quantity of image data to be decompressed in a case of overflow of the buffer; and beginning with said oldest identified image, perform simulating a data filling level of the receiver buffer again for each successive image in the video sequence; and compress the image sequence a second time using computed normalized compression factor values for the compression factor value associated with each image.

* * * * *